United States Patent
Yilmazer et al.

(10) Patent No.: US 9,912,470 B2
(45) Date of Patent: Mar. 6, 2018

(54) SYSTEM AND METHOD FOR WIDE-BAND ADAPTIVE EQUALIZATION AND EYE OPENING MONITORING WITH LINK QUALITY DETECTION

(71) Applicant: Maxim Integrated Products, Inc., San Jose, CA (US)

(72) Inventors: Caglar Yilmazer, Istanbul (TR); Arda K. Bafra, Istanbul (TR)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 15/469,203

(22) Filed: Mar. 24, 2017

(65) Prior Publication Data
US 2017/0279599 A1    Sep. 28, 2017

Related U.S. Application Data

(60) Provisional application No. 62/313,936, filed on Mar. 28, 2016.

(51) Int. Cl.
| H04B 7/08 | (2006.01) |
| H04L 7/08 | (2006.01) |
| H04L 1/20 | (2006.01) |
| H04B 1/38 | (2015.01) |

(52) U.S. Cl.
CPC ............. *H04L 7/08* (2013.01); *H04B 1/38* (2013.01); *H04L 1/20* (2013.01)

(58) Field of Classification Search
CPC .............. H04L 7/08; H04L 1/20; H04B 1/38
See application file for complete search history.

(56) References Cited

U.S. PATENT DOCUMENTS

| 7,103,288 | B2 * | 9/2006 | Wang | H04B 10/66 250/214 R |
| 8,872,978 | B2 | 10/2014 | Ritter et al. | |
| 2003/0016605 | A1 * | 1/2003 | Tateyama | H04B 10/25133 369/47.26 |
| 2004/0131365 | A1 * | 7/2004 | Lee | H04B 10/58 398/197 |
| 2011/0317789 | A1 * | 12/2011 | Willcocks | H04L 7/007 375/316 |
| 2016/0365922 | A1 * | 12/2016 | Lipkin | H04B 10/07957 |

* cited by examiner

*Primary Examiner* — Jaison Joseph
(74) *Attorney, Agent, or Firm* — Advent, LLP

(57) ABSTRACT

A method for assessing link quality includes detecting an eye opening of a transmission link. The detected eye opening of the transmission link is compared with a threshold eye opening or at least one previously detected eye opening. A link quality of the transmission link is assessed based upon a comparison of the eye opening with the threshold eye opening or the at least one previously detected eye opening.

17 Claims, 7 Drawing Sheets

SYSTEM AND METHOD FOR WIDE-BAND ADAPTIVE EQUALIZATION AND EYE OPENING MONITORING WITH LINK QUALITY DETECTION

CROSS-REFERENCE TO RELATED APPLICATIONS

The present application claims the benefit under 35 U.S.C. § 119(e) of U.S. Provisional Application Ser. No. 62/313,936, filed Mar. 28, 2016, and titled "SYSTEM AND METHOD FOR WIDE-BAND ADAPTIVE EQUALIZATION AND EYE WIDTH MONITORING WITH LINK QUALITY DETECTION," which is incorporated herein by reference in its entirety.

BACKGROUND

Transmission links (e.g., cables) are employed in a variety of communication systems. For example, transmission links are often used in communication systems including, but not limited to, telecommunication systems, security systems, sound systems, television broadcasting systems, internet broadcasting systems, power distribution networks, and so forth. Transmission links can age, and as a result, their link quality can deteriorate over time. In some cases, aged transmission links may not be identified and replaced until they are no longer useful (e.g., no longer capable of transmitting coherent data signals). Methods of objectively assessing link quality of transmission links are needed to detect aged transmission links before they cause interruptions within the communication systems in which they are deployed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Overview

Figure 1:
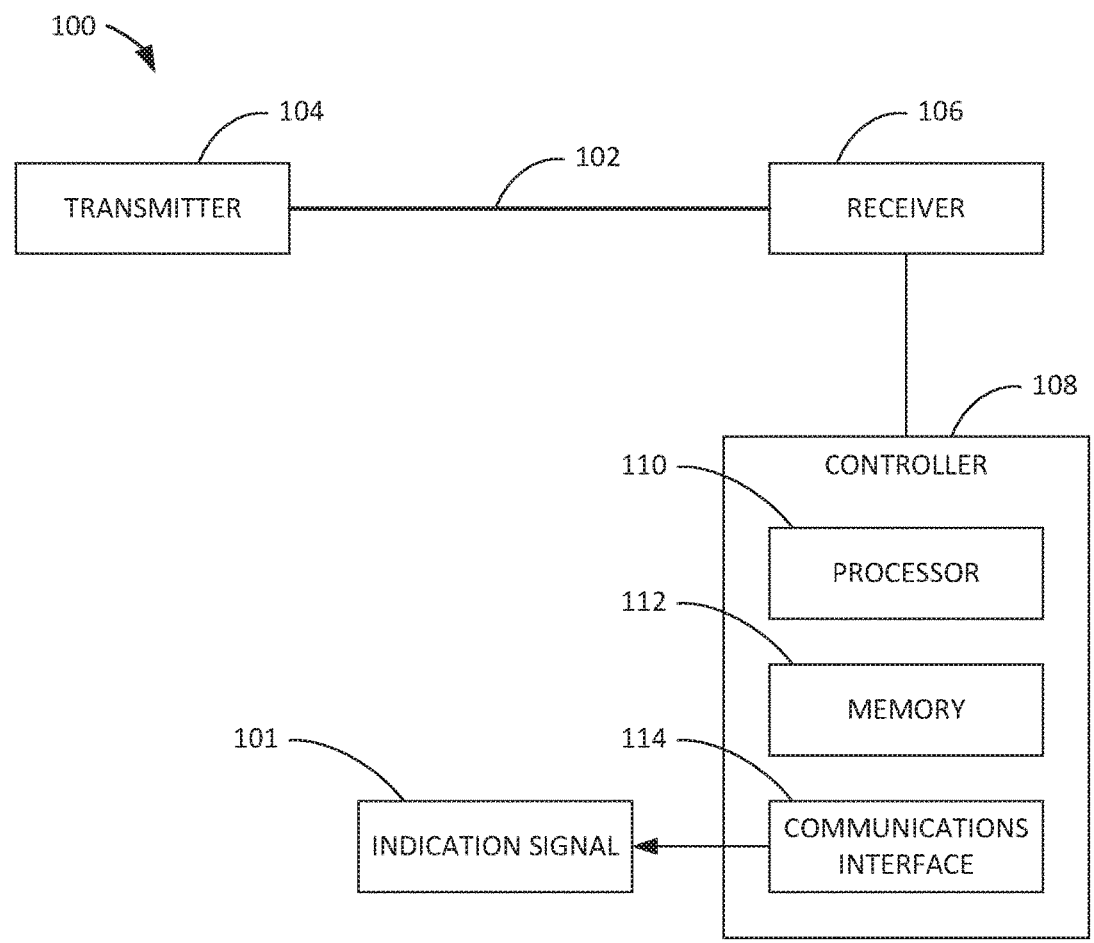
FIG. 1 is a block diagram illustrating a communication system that can employ a system for assessing link quality of a transmission link, in accordance with an example implementation of the present disclosure.

Transmission links (e.g., single-wire cables, multi-wire cables, coaxial cables, twisted pair cables, and the like) are employed in to transfer data from a transmitter (e.g., a transmitter, transceiver, repeater, etc.) to a receiver (e.g., a receiver, transceiver, repeater, etc.). For example, transmission links are often used to transfer data between transmitters and receivers in communication systems. Examples of communication systems include, but are not limited to, telecommunication systems, security systems, sound systems, television broadcasting systems, internet broadcasting systems, sensor systems, control systems, power distribution networks, and the like.

Transmission links age over time, and as a result, their link quality begins to deteriorate. Methods of objectively assessing link quality of transmission links are needed to detect aged transmission links before they cause interruptions within the communication systems in which they are deployed. Link quality can be assessed by monitoring equalizer boost levels and/or tap values over time. However, the eye opening of a transmission link can degrade even if boost stays constant. Examples of an "eye opening" include an eye metric/parameter such as, but not limited to, an eye width, eye height, eye area (e.g., eye width×eye height), or the like.

A method for assessing link quality of a transmission link is disclosed. According to the method, an eye opening of the transmission link is detected. In implementations, the eye opening can be detected by providing a first clock signal and a second clock signal that has a predetermined phase offset from the first clock signal. A signal is then generated based upon the first and second clock signals. In some implementations, the generated signal is aligned (e.g., phase aligned) with the first clock signal. The generated signal is then phase shifted incrementally. For example, the generated signal can be phase shifted according to a successive approximation register (SAR) or binary search algorithm. A data signal received from the transmission link is sampled based upon the first clock signal and one or more instances (e.g., phase-shifted versions or copies) of the generated signal. The samples are then compared to determine the eye opening of the transmission link. For example, samples having an expected bit value (1 or 0) can be identified to determine the eye opening of the transmission link, where the eye opening is associated with at least one phase shift value of the generated signal. In some implementations, the generated signal can be phase shifted a number of times in a first direction and a number of times in a second direction in order to identify left and right boundaries of the "eye opening." The detected eye opening of the transmission link can be compared with a threshold eye opening or at least one previously detected eye opening. A link quality of the transmission link is assessed based upon a comparison of the eye opening with the threshold eye opening or the at least one previously detected eye opening.

Example Implementations

FIG. 1 illustrates a communication system 100 in accordance with an embodiment of this disclosure. For example, the communication system 100 can include, but is not limited to, a telecommunication system, security system, sound system, television broadcasting system, internet broadcasting system, sensor system, control system, power distribution network, or the like. The communication system 100 includes at least one transmitter 104 and at least one receiver 106 communicatively coupled to one another by a transmission link 102 (e.g., a single-wire cable, multi-wire cable, coaxial cable, twisted pair cable, or the like). In embodiments, the transmitter 104 is configured to transmit data signals, and the receiver 106 is configured to receive data signals via the transmission link. In some embodiments, the transmitter 104 and/or the receiver 106 can be configured to bi-directionally communicate data signals or to retransmit (e.g., repeat) data signals. For example, the transmitter 104 and/or the receiver 106 can include a transceiver, a repeater, or the like.

The communication system 100, including some or all of its components, can operate under computer control. For example, a processor 110 can be included with or in a controller 108 to control the components and functions of the communication system 100 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the communication system 100. In the case of a software implementation, the module, functionality, or logic represents program code (e.g., algorithms embodied in a non-transitory computer readable medium) that performs specified tasks when executed on a processor (e.g., central processing unit (CPU) or CPUs). The program code can be stored in one or more non-transitory computer-readable memory devices or media (e.g., internal memory and/or one or more tangible media), and so on. For example, memory may include but is not limited to volatile memory, non-volatile memory, Flash memory, SRAM, DRAM, RAM and ROM. The structures, functions, approaches, and techniques described herein can be implemented on a variety of commercial computing platforms having a variety of processors.

As shown in FIG. 1, the receiver 106 is communicatively coupled to the controller 108. The controller 108 can include a processor 108, a memory 112, and a communications interface 114. The processor 110 provides processing functionality for at least the controller 108 and can include any number of processors, micro-controllers, circuitry, field programmable gate array (FPGA) or other processing systems, and resident or external memory for storing data, executable code, and other information accessed or generated by the controller 108. The processor 110 can execute one or more software programs embodied in a non-transitory computer readable medium that implement techniques described herein. The processor 110 is not limited by the materials from which it is formed or the processing mechanisms employed therein and, as such, can be implemented via semiconductor(s) and/or transistors (e.g., using electronic integrated circuit (IC) components), and so forth.

The controller 108 may include a memory 112 (e.g., Flash memory, RAM, SRAM, DRAM, ROM, etc.). The memory 112 can be an example of tangible, computer-readable storage medium that provides storage functionality to store various data and or program code associated with operation of the controller 108, such as software programs and/or code segments, or other data to instruct the processor 110, and possibly other components of the communication system 100/controller 108, to perform the functionality described herein. Thus, the memory 112 can store data, such as a program of instructions for operating the communication system 100 (including its components), and so forth. It should be noted that while a single memory 112 is described, a wide variety of types and combinations of memory (e.g., tangible, non-transitory memory) can be employed. The memory 112 can be integral with the processor 110, can comprise stand-alone memory, or can be a combination of both.

Some examples of the memory 112 can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the communication system 100 and/or the memory 112 can include removable integrated circuit card (ICC) memory, such as memory provided by a subscriber identity module (SIM) card, a universal subscriber identity module (USIM) card, a universal integrated circuit card (UICC), and so on.

The controller 108 may include a communications interface 114. The communications interface 114 can be operatively configured to communicate with components of the communication system 100. For example, the communications interface 114 can be configured to transmit data for storage in the communication system 100, retrieve data from storage in the communication system 100, and so forth. The communications interface 114 can also be communicatively coupled with the processor 110 to facilitate data transfer between components of the communication system 100 and the processor 110 (e.g., for communicating inputs to the processor 110 received from a device communicatively coupled with the communication system 100/controller 108). It should be noted that while the communications interface 114 is described as a component of controller 108, one or more components of the communications interface 114 can be implemented as external components communicatively coupled to the communication system 100 via a wired and/or wireless connection. The communication system 100 can also include and/or connect to one or more input/output (I/O) devices (e.g., via the communications interface 114), such as a display, a mouse, a touchpad, a touchscreen, a keyboard, a microphone (e.g., for voice commands) and so on.

The communications interface 114 and/or the processor 110 can be configured to communicate with a variety of different networks, such as a wide-area cellular telephone network, such as a cellular network, a 3G cellular network, a 4G cellular network, or a global system for mobile communications (GSM) network; a wireless computer communications network, such as a WiFi network (e.g., a wireless local area network (WLAN) operated using IEEE 802.11 network standards); an ad-hoc wireless network, an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 114 can be configured to communicate with a single network or multiple networks across different access points. In a specific embodiment, a communications interface 114 can transmit information from the controller 108 to an external device (e.g., a cell phone, a computer connected to a WiFi network, cloud storage, etc.). In another specific embodiment, a communications interface 114 can receive information from an external device (e.g., a cell phone, a computer connected to a WiFi network, cloud storage, etc.).

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may comprise various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Figure 2:
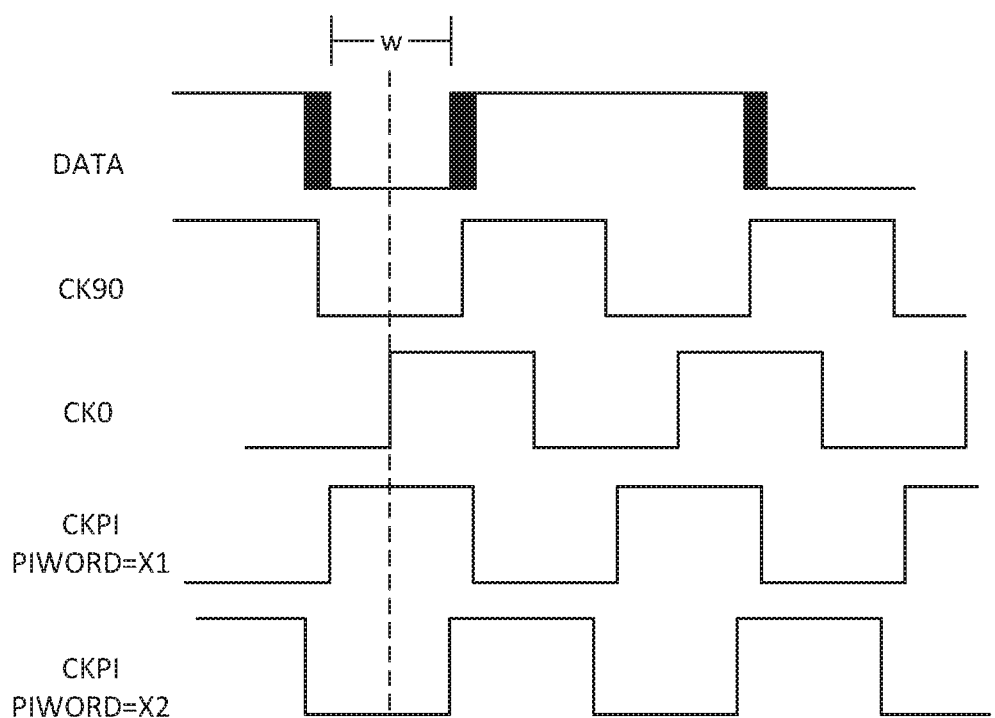
FIG. 2 is a graphical depiction of example waveforms for a communication system, such as the communication system of FIG. 1, including a data signal (DATA) that can be transmitted by a transmission link, a first clock signal (CK0), a second clock signal (CK90) having a predetermined offset from the first clock signal, and at least one generated signal (CKPI) for determining an eye opening (w) of the data signal (DATA), in accordance with an example implementation of the present disclosure.

In embodiments, the communication system 100 employs a variable phase clock signal (e.g., signal CKPI) synchronized to a recovered clock signal (e.g., signal CK0) in order to detect an eye opening of the transmission link 102. FIG. 2 depicts example waveforms of a data signal DATA, a first clock signal CK0, a second clock signal CK90 having a predetermined phase offset from the first clock signal CK0, and at least one generated (e.g., variable phase clock synchronized) signal CKPI that can be employed for half rate clock and data recovery (CDR), or for full-rate CRD or the like. The controller 108 can be configured to utilize the data signal DATA as a non-return to zero (NRZ) data input for CDR. The controller 108 is configured to receive the data signal DATA via receiver 106 from the transmission link 102. In some embodiments, the controller 108 is configured to generate the first clock signal CK0 and the second clock signal CK90. For example, the controller 108 can employ one or more clock signals generated by or coupled to the processor 110. In other embodiments, the controller 108 can be configured to receive the first clock signal CK0 and/or the second clock signal CK90 from an external source (e.g., an external crystal, oscillator, or from another controller or signal source). In some embodiments, the first clock signal CK0 and the second clock signal CK90 are voltage controlled oscillator (VCO) clock signals (e.g., quadrature VCO clock signals).

In an embodiment illustrated in FIG. 2, the controller 108 is configured to sample a middle portion of the data signal DATA according to the first clock signal CK0 (e.g., at rising or falling edges of CK0) and is configured to sample an edge portion of the data signal DATA according to the second clock signal CK90 (e.g., at rising or falling edges of CK90). The controller 108 is configured to generate signal CKPI based upon the first clock signal CK0 and the second clock signal CK90. For example, the controller 108 is configured to perform a phase interpolator algorithm that combines (e.g., sums) weighted versions of the first clock signal CK0 and the second clock signal CK90. According to the phase interpolator algorithm, the controller 108 is configured to receive or generate a phase word input PIWORD that affects weightings of the first clock signal CK0 and the second clock signal CK90 in conjunction with or prior to the controller 108 combining the signals. Other algorithms exist for phase interpolation. The controller 108 can be configured to perform any phase interpolation algorithm.

The second clock signal CK90 has an offset (e.g., a programmed or predetermined offset) from the first clock signal CK0. In some embodiments, the second clock signal CK90 has a 90 degree phase offset from the first clock signal CK0. However, the second clock signal may have a different phase offset from the first clock signal CK0. For example, the second clock signal can have a 45 degree offset, a 135 degree offset, or the like. Additional phases for clocks (e.g., 45 degrees, 135 degrees, etc.) may also be used to improve the phase interpolator accuracy.

If the phase word PIWORD is increased or decreased, the phase of signal CKPI changes with respect to the first clock signal CK0. When CKPI approaches an edge of the data signal DATA, samples of the data signal DATA taken according to signal CKPI and the first clock signal CK0 begin to differ. In FIG. 2, two boundaries are shown: PIWORD=X1 and PIWORD=X2. Sweeping the phase beyond X1 and X2 causes mismatch between CKPI and CK0 samples of DATA. In some embodiments, the phase of signal CKPI is continuously increased and the controller 108 is configured to identify the window in which the CKPI and CK0 samples of DATA have the same bit value (e.g., both 1 or both 0). Note that the CKPI and CK0 samples of DATA do not need to be exactly the same. For example, a programmable threshold can be chosen for mismatches (errors). The controller 108 is configured to determine with eye opening w of the data signal DATA (i.e., the eye opening of the transmission link 102) based upon the identified window in which the CKPI and CK0 samples of DATA have the same bit value.

Figure 3:
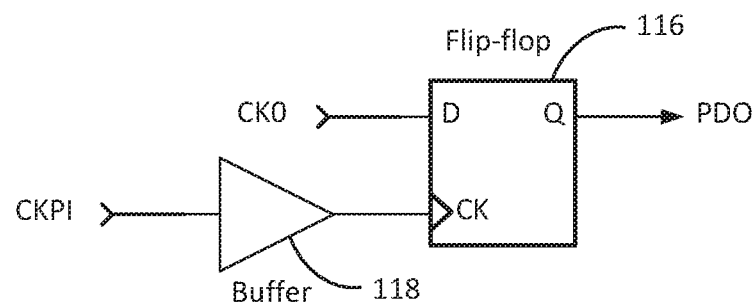
FIG. 3 is a block diagram illustrating logic that can be employed by a controller of a communication system, such as the communication system of FIG. 1, for phase alignment of a first clock signal (CK0) and a generated signal (CKPI), in accordance with an example implementation of the present disclosure.
Figure 4:
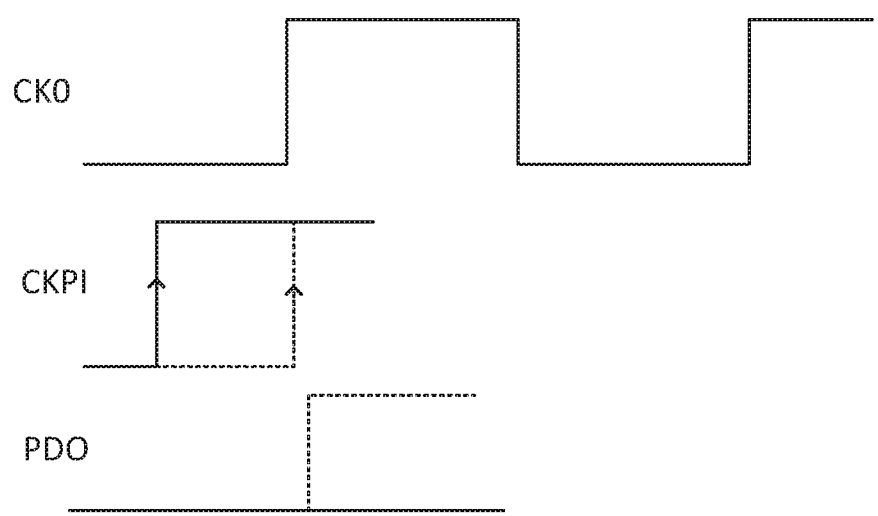
FIG. 4 is a graphical depiction of example waveforms for a communication system, such as the communication system of FIG. 1, including a clock signal (CK0), a generated signal (CKPI), and a phase alignment indicator signal (PDO), in accordance with an example implementation of the present disclosure.

In some embodiments, the controller 108 is configured to perform an initial alignment of signal CKPI and the first clock signal CK0. When these signals are initially aligned (e.g., prior to performing the phase interpolator algorithm), the controller 108 can be configured to perform a successive approximation register (SAR) or binary search algorithm to detect the eye opening w (e.g., by detecting the window in which CKPI and CK0 samples of DATA have the same bit value). Employing a SAR or binary search algorithm can reduce calculation time for detecting the eye opening w of the transmission link 102. In some embodiments, when signal CKPI and the first clock signal CK0 at the outset, skew of the first clock signal CK0 with respect to the data signal DATA can be measured as well. FIG. 3 shows an example of circuitry or logic that can be used to align the first clock signal CK0 and signal CKPI. In some embodiments, the circuitry/logic shown in FIG. 3 is embodied by controller 108. For example, the controller 108 can include circuit components or logic (e.g., embodied in a software module stored in memory 112). In embodiments, the circuitry/logic includes a flip-flop 116 configured to detect a phase match or mismatch of input signals, which in this case are the first clock signal CK0 and signal CKPI. For example, the flip-flop 116 can be configured as a bang-bang phase detector or the like. The circuitry/logic can also include a buffer 118 at the clock CK input of the flip-flop 116 to null a phase detector offset (PDO) due to setup time. During the phase alignment process, the controller 108 is configured to increase the phase of signal CKPI incrementally and monitor PDO. The controller 108 can be configured to determine an alignment of the first clock signal CK0 and signal CKPI when PDO toggles from low to high. For example, FIG. 4 shows example waveforms of CK0, CKPI, and PDO, where toggling of PDO indicates alignment of CK0 and CKPI rising edges. In some implementations, PDO can be further processed by subsequent circuitry/logic to improve accuracy and prevent erroneous decisions. For example, PDO can be sampled with another clock signal (e.g., a slower clock signal than CK0).

For each phase step, the controller 108 can be configured to collect a plurality of samples of the data signal DATA according to the first clock signal CK0 and signal CKPI. The controller 108 can be configured to perform a voting algorithm on the samples to increase robustness against environmental and device noises. The controller 108 can also be configured to provide alignment of mean values of signal CKPI and the first clock signal CK0 to reduce jitter that can affect the signals. The controller 108 can also be configured to sample the first clock signal CK0 and/or signal CKPI during the phase alignment process in order to prevent accidental alignment of CKPI rising edge to CK0 falling edge.

In embodiments, after CKPI and CK0 rising edges are aligned, the controller 108 is configured to detect the eye opening w by phase shifting signal CKPI and collecting CK0 and CKPI samples of the data signal DATA to determine the window in which the CKPI and CK0 samples of DATA have the same bit value. The controller 108 can be configured to perform a binary search algorithm, e.g., counting by 1. In some embodiments, the controller 108 is configured to perform a SAR algorithm, which may improve efficiency. For example, if a phase interpolator algorithm employs 128 steps, 32 steps (e.g., 5-bits) may be used to calculate the window in which the CKPI and CK0 samples of DATA have the same bit value. In this example, 32 phase steps can be calculated in five SAR steps, which is at least six times faster than the binary counting method. In some embodiments, the controller 108 is further configured to deserialize CKPI and CK0 samples of DATA and count the deserialized (e.g., de-muxed) values, which may be lower speed and easier to process. Although eye opening scanning for a horizontal axis is described, the eye opening w can also be scanned vertically if the controller 108 employs a slicer with programmable slicing level.

The controller 108 is configured to assess link quality of the transmission link 102 based on the detected an eye opening w of the transmission link 102. In one embodiment, the controller 108 is configured to compare the eye opening w with a threshold eye opening. The controller 108 can be configured assess the link quality of the transmission link 102 based upon this comparison. For example, the controller 108 can be configured to provide an indication signal 101 (e.g., an alert signal) when the detected eye opening w of the transmission link 102 is below the threshold eye opening, as this can indicate that the transmission link 102 has aged or deteriorated past a useful-life threshold. In another embodiment, the controller 108 is configured to compare the detected eye opening w with at least one previously detected eye opening (e.g., eye openings w detected and stored in memory 112 over time). The controller 108 may compare the detected eye openings w over time to determine a rate of change (e.g., a rate of reduction of the eye opening w). The controller 108 can be configured to provide an indication signal 101 (e.g., an alert signal) when a determined rate of reduction of the eye opening w exceeds a threshold rate of reduction (e.g., when the eye opening w is rapidly deteriorating). It is noted that signal quality can change due to impedance discontinuity, noise interferences, and the like. In some embodiments, the controller 108 can be configured to detect multiple measurements of the eye opening w and provide an indication signal 101 (e.g., an alert signal) after a number of successive measurements indicate link quality deterioration in order to prevent erroneous indications resulting from other noise factors.

The controller 108 may be configured to assess the link quality of the transmission link based upon a combination of factors. For example, in some embodiments, the controller 108 is further configured to detect a boost or equalizer tap value associated with the transmission link 102. The controller 108 can be configured to assess the link quality of the transmission link 102 based upon the detected eye opening w of the transmission link and the boost or equalizer tap value. Taking into account the equalizer boost value, the controller 108 can detect if the link quality is deteriorating (e.g., link loss is increasing over time, e.g., due to aging), which may be important for some applications. For example, the controller 108 can be configured to provide an indication signal 101 (e.g., an alert signal) when the boost or equalizer tap value exceeds a respective threshold value, or when the eye opening w falls below an eye opening threshold value and the boost or equalizer tap value exceeds a respective threshold value. Other parameters can be taken into account as well. For example, in some embodiments, the controller 108 is further configured to detect or receive an indication of a chip temperature (e.g., receiver 106 and/or controller 108 temperature) associated with the transmission link 102. The controller 108 can be configured to assess the link quality of the transmission link 102 based upon the detected eye opening w of the transmission link and the chip temperature and/or the boost or equalizer tap value.

Figure 5A:
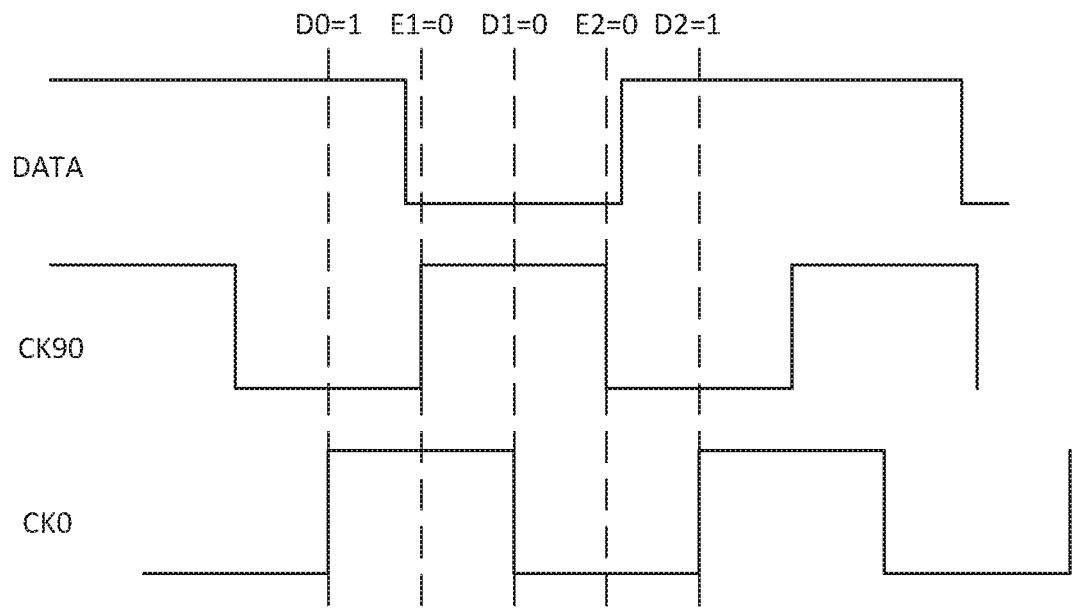
FIG. 5A is a graphical depiction of example waveforms for a communication system, such as the communication system of FIG. 1, including a data signal (DATA), a first clock signal (CK0), and a second clock signal (CK90) sampled at various times to detect inter-symbol interference (ISI), in accordance with an example implementation of the present disclosure.
Figure 5B:
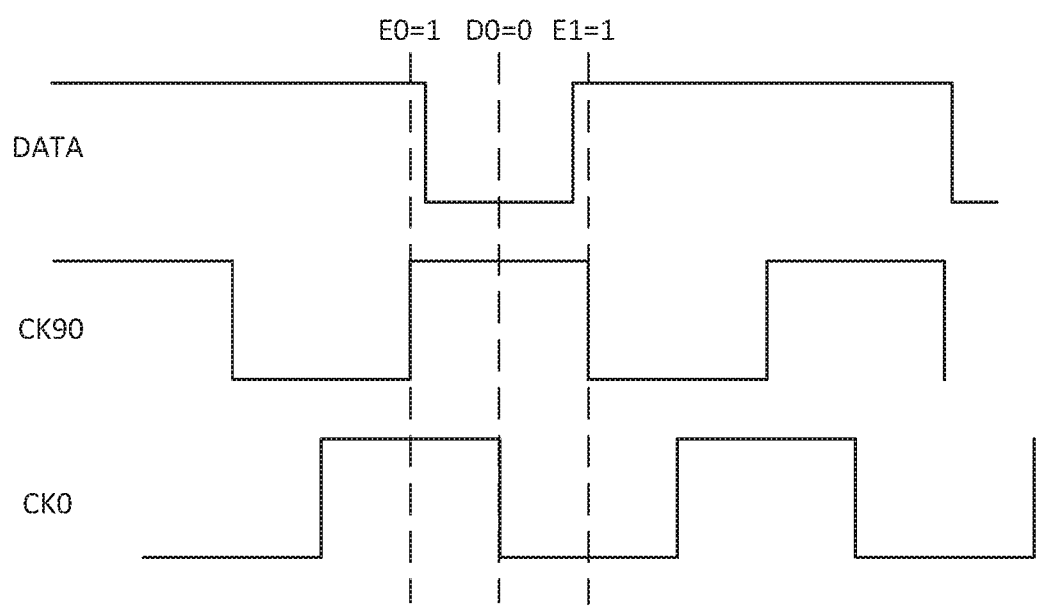
FIG. 5B is a graphical depiction of example waveforms for a communication system, such as the communication system of FIG. 1, including a data signal (DATA), a first clock signal (CK0), and a second clock signal (CK90) sampled at various times to detect inter-symbol interference (ISI), in accordance with an example implementation of the present disclosure.
Figure 6:
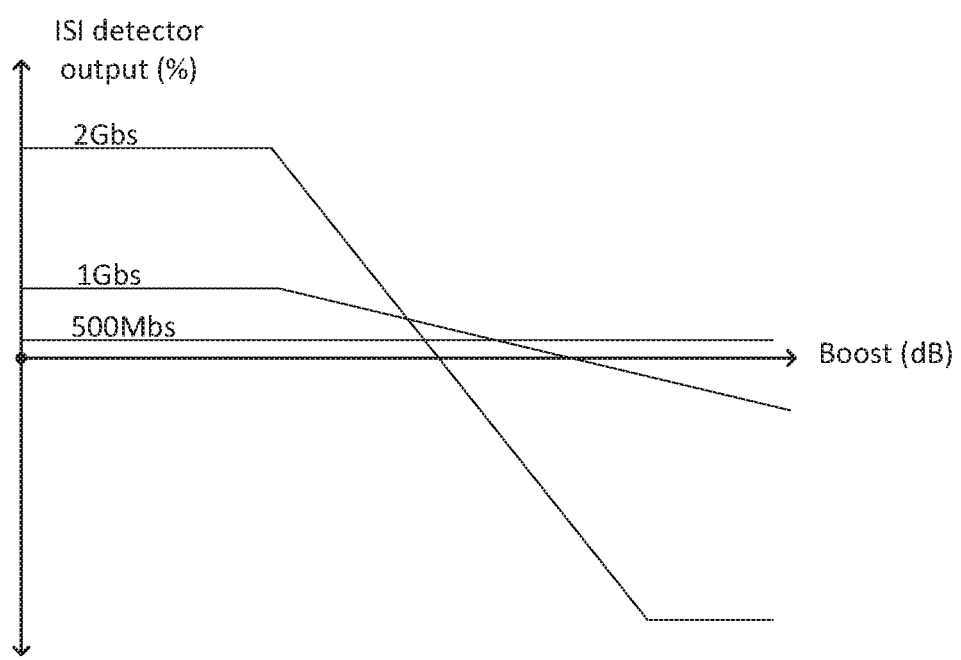
FIG. 6 is a graphical plot for a communication system, such as the communication system of FIG. 1, illustrating ISI percentage vs. boost values at various bitrates, in accordance with an example implementation of the present disclosure.

In embodiments, the controller 108 is configured to perform an adaptive equalization algorithm. Adaptive equalizers are beneficial for time varying transmission mediums as well as voltage and temperature variations of integrated circuits. The controller 108 can be configured to detect inter-symbol interference (ISI) for equalizer adaptation. In an implementation shown in FIGS. 5A and 5B, the controller 108 is configured to perform a pulse based adaptation by assessing data and edge samples of the data signal DATA (as shown in FIG. 5A). If a "101" data pattern is caught and edge samples are both low (FIG. 5A), the data signal DATA may be over boosted. When this occurs, the controller 108 can be configured to increase a first counter (hereinafter "DNEQ counter") by one. If the data bit between two equal edge samples is different (e.g., edges samples=1 and data=0, as shown in FIG. 5B), the data signal DATA may be under boosted. When this occurs, the controller 108 can be configured to increase a second counter (hereinafter "UPEQ counter") by one. When total amount of UPEQ and DNEQ samples reach a predefined value, controller 108 is configured to determine a difference (e.g., UPEQ–DNEQ). If the difference is less than zero, the transmission link 102 is over boosted, and the controller 108 can be configured to reduce the boost value for the transmission link 102. If the difference is greater than zero, the controller 108 can be configured to increase the boost value for the transmission link 102. The eye opening w can be improved by providing a boost value where the difference between the UPEQ counter value and the DNEQ counter value is close to zero. In one implementation, the controller 108 is configured to begin at a first (e.g., maximum) boost value for the transmission link 102 and continue to lower the boost value until a sign change of UPEQ–DNEQ is detected. If peaking frequency of equalizer is fixed and adjusted according to the highest data rate supported, ISI at lower rates due to over boost will not be as strong as the maximum rate. Typically, the boost will tend to go higher as data rate goes down and will get clipped at a maximum boost level below a certain data rate. For example, FIG. 6 shows example plots of detected ISI (as a percentage) over a range of boost values for various data rates. In FIG. 6, the y-axis is (ISI=UPEQ–DNEQ)/(UPEQ+DNEQ), and the x-axis is equalizer boost value in decibels (dB). The slope of plotted curves is associated with a gain value of the detected ISI, which is lower at 1 Gbs compared to 2 Gbs, in this illustrated example. The ISI/boost curve can become substantially flat at 500 Mbs; however, in practice, the curve is not flat but noisy, which can cause fluctuations in boost levels at each calculation.

The controller 108 may be configured to prevent boost fluctuations. In some embodiments, the controller 108 may be configured to prevent boost from lowering further if UPEQ-DNEQ gets higher than a positive threshold. If the controller 108 determines a gain value associated with the ISI is less than a predefined threshold, the controller 108 can be configured to prevent boost wandering by setting boost to a fixed value (e.g., a maximum boost value). In some embodiments, the controller 108 is configured to measure ISI over a range of boost values. For example, the controller 108 can be configured to decrease boost until the sign of UPEQ-DNEQ changes. The controller 108 may be configured to determine a gain value of the ISI measured over the range of boost values (e.g., based on the ISI/boost slope). When the gain value is below a threshold gain value, the controller 108 can be configured to set the boost value to a boost value associated with a lowest (absolute value) measurement of ISI. In this regard, the controller 108 can be configured to set the boost value at or near a maximum boost level (e.g., point at which an ISI/boost curve of FIG. 6 intersects the x-axis).

Example Processes

Figure 7:
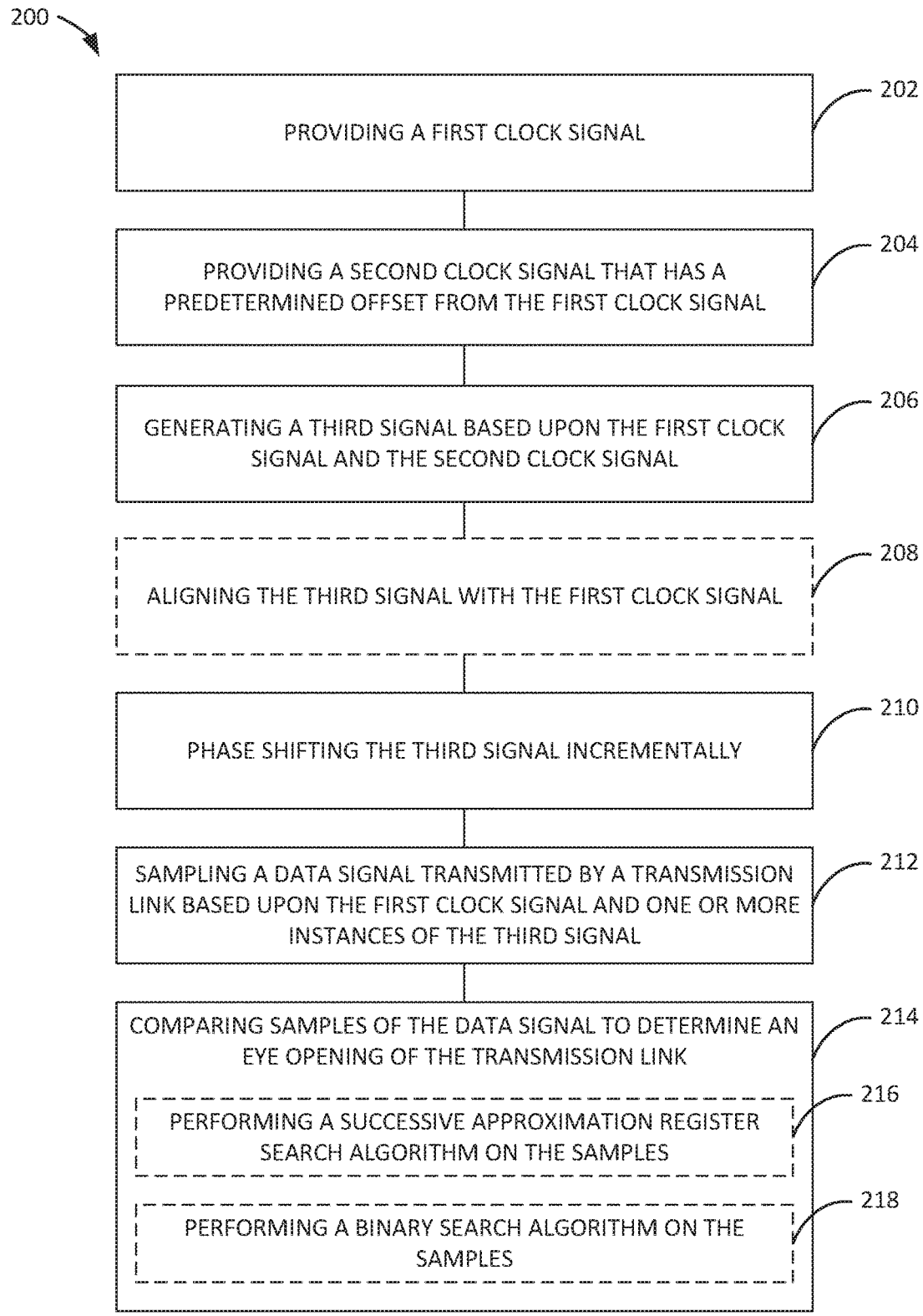
FIG. 7 is a flow diagram illustrating a process for detecting eye opening of a data signal transmitted by a transmission link of a communication system, such as the communication system of FIG. 1, in accordance with an example implementation of the present disclosure.
Figure 8A:
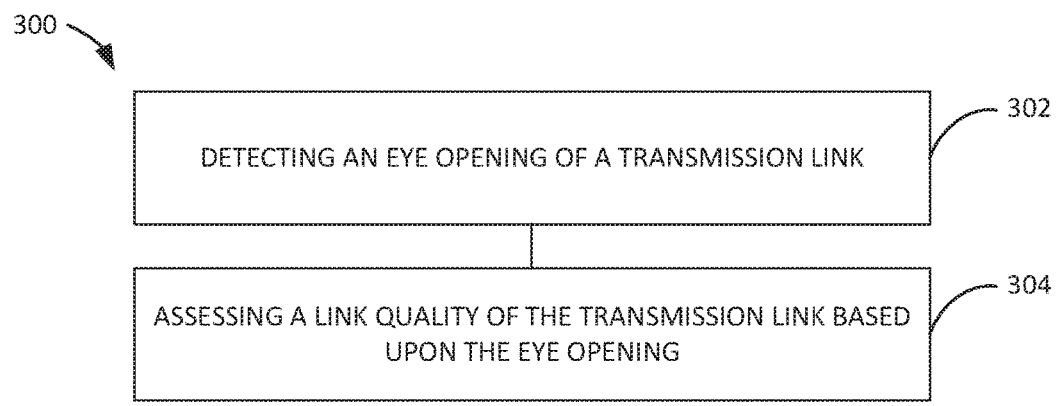
FIG. 8A is a flow diagram illustrating a process for assessing link quality of a transmission link of a communication system, such as the communication system of FIG. 1, in accordance with an example implementation of the present disclosure.
Figure 8B:
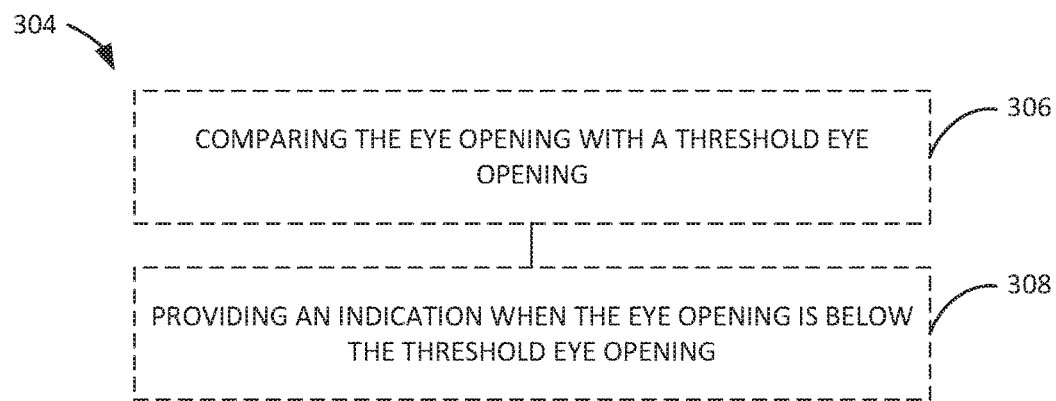
FIG. 8B is a flow diagram illustrating a process for assessing link quality of a transmission link of a communication system, such as the communication system of FIG. 1, in accordance with an example implementation of the present disclosure.
Figure 8C:
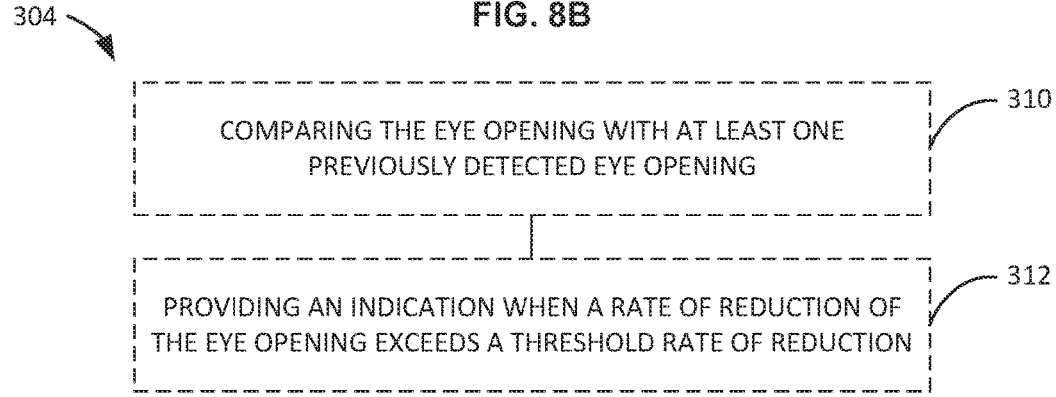
FIG. 8C is a flow diagram illustrating a process for assessing link quality of a transmission link of a communication system, such as the communication system of FIG. 1, in accordance with an example implementation of the present disclosure.

FIG. 7 illustrates an example implementation of a process 200 that employs techniques described herein to determine an eye opening of a transmission link, such as the transmission link 102 of the communication system 100 shown in FIG. 1. FIGS. 8A through 8C illustrates example implementations of a process 300 that employs techniques described herein to assess a link quality of a transmission link, such as the transmission link 102 of the communication system 100 shown in FIG. 1. In general, operations of disclosed processes (e.g., process 200 and/or process 300) may be performed in an arbitrary order, unless otherwise provided in the claims.

As shown in FIG. 7, a process 200 for determining an eye opening (or eye opening) of a transmission link includes providing a first clock signal CK0 (block 202) and providing a second clock signal CK90 that has a predetermined phase offset from the first clock signal CK0 (block 204). In some implementations, a controller 108 generates the first clock signal CK0 and the second clock signal CK90. In other implementations, the controller 108 receives the first clock signal CK0 and/or the second clock signal CK90 from an external source (e.g., an external crystal, oscillator, or from another controller or signal source).

Another (e.g., third) signal CKPI can be generated based upon the first clock signal CK0 and the second clock signal CK90 (block 206). For example, the controller 108 can perform a phase interpolator algorithm that combines (e.g., sums) weighted versions of the first clock signal CK0 and the second clock signal CK90 in order to generate signal CKPI. In some implementations, the controller 108 receives or generates a phase word input PIWORD that affects weightings of the first clock signal CK0 and the second clock signal CK90 in conjunction with or prior to the controller 108 combining the signals to generate signal CKPI.

In some implementations, the generated signal CKPI is aligned with the first clock signal CK0 (block 208). For example the controller 108 can perform a phase alignment for signal CKPI with the first clock signal CK0 to align or substantially align respective phases of the two signals.

Signal CKPI is phase shifted incrementally (block 210). For example, signal CKPI can be shifted with respect to the first clock signal CK0, in a first direction and/or in a second direction, by increasing or decreasing the phase word PIWORD.

The data signal DATA is sampled based on the first clock signal CK and one or more instances (e.g., phase-shifted versions or copies) of signal CKPI (block 212). When signal CKPI approaches an edge of the data signal DATA, samples of the data signal DATA taken according to signal CKPI and the first clock signal CK0 begin to differ.

The CKPI and CK0 data samples can be compared to determine the eye opening w of the transmission link 102 (block 214). For example, the phase of signal CKPI can be incrementally increased and/or decreased while the data signal DATA is sampled to identify the window in which the CKPI and CK0 samples of DATA have the same bit value.

Note that the CKPI and CK0 samples of DATA do not need to be exactly the same. For example, a programmable threshold can be chosen for mismatches (errors). In implementations, the controller 108 can determine the eye opening w of the data signal DATA (i.e., the eye opening of the transmission link 102) based upon the identified window in which the CKPI and CK0 samples of DATA have the same bit value. In some implementations (e.g., where CKPI and CK0 are aligned), a SAR or binary search algorithm can be employed to identify the window in which the CKPI and CK0 samples of DATA have the same bit value (block 216 or 218).

Referring now to FIGS. 8A through 8C, a process 300 for assessing link quality of a transmission link 102 includes detecting an eye opening w of the transmission link 102 (block 302). For example, a process, such as process 200, can be employed to detect the eye opening w of the transmission link 102. The link quality of the transmission link is assessed based upon the detected eye opening w (block 304).

In an implementation shown in FIG. 8B, assessing the link quality (block 304) can include comparing the eye opening w with a threshold eye opening (block 306). For example, a controller 108 can monitor the eye opening w and continuously or periodically compare measurements of the eye opening w with a predefined (e.g., programmed) threshold eye opening. An indication (e.g., a communication signal, alarm, or the like) can be provided when the detected eye opening w is below the threshold eye opening w (block 308). For example, the controller 108 can provide an indication signal 101 via the communications interface 114.

In another implementation shown in FIG. 8C, assessing the link quality (block 304) can include comparing the eye opening w with at least one previously detected eye opening (block 310). For example, a controller 108 can perform measurements of the eye opening w over time and can the compare measurements of the eye opening w taken over time to determine a rate of reduction of the eye opening w over time. The rate of reduction of the eye opening w can be compared with a predefined threshold rate of reduction (e.g., programmed or otherwise specified threshold rate of eye opening deterioration). An indication (e.g., a communication signal, alarm, or the like) can be provided when the determined rate of reduction of the eye opening w exceeds the threshold rate of reduction (block 312), e.g., when the eye opening is rapidly deteriorating.

In some implementations, a combination of factors are used to assess link quality of a transmission link 102. For example, boost or equalizer tap value associated with the transmission link 102 can be detected, and the link quality of the transmission link 102 may be assessed based upon the detected eye opening w of the transmission link and the boost or equalizer tap value. For example, an indication (e.g., a communication signal, alarm, or the like) can be provided when the boost or equalizer tap value exceeds a respective threshold value, or when the eye opening w falls below a threshold eye opening value and the boost or equalizer tap value exceeds a respective threshold value. Other parameters can be taken into account as well. For example, a chip temperature (e.g., receiver 106 and/or controller 108 temperature) associated with the transmission link 102 is also detected or monitored. In some implementations, the link quality of the transmission link 102 is assessed based upon the detected eye opening w of the transmission link and the chip temperature and/or the boost or equalizer tap value. The foregoing are some examples of additional parameters that can be monitored along with eye opening in order to provide an objective assessment of link quality for a transmission link 102. Any combination of factors may be considered in conjunction with eye opening to make an assessment of the link quality.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method for assessing link quality, comprising:
   providing a first clock signal;
   providing a second clock signal that has a predetermined phase offset from the first clock signal;
   generating a third signal based upon the first clock signal and the second clock signal;
   phase shifting the third signal incrementally;
   sampling a data signal transmitted by the transmission link based upon the first clock signal and one or more instances of the third signal;
   comparing samples of the data signal to determine an eye opening of the transmission link;
   comparing the eye opening with at least one of a threshold eye opening or at least one previously detected eye opening; and
   assessing a link quality of the transmission link based upon a comparison of the eye opening with the at least one of the threshold eye opening or the at least one previously detected eye opening.

2. The method of claim 1, further comprising: providing an indication when the eye opening is below the threshold eye opening.

3. The method of claim 1, further comprising: providing an indication when a rate of reduction of the eye opening exceeds a threshold rate of reduction, wherein the rate of reduction of the eye opening is based upon a comparison of the eye opening with the at least one previously recorded eye opening.

4. The method of claim 1, wherein comparing the samples of the data signal to determine the eye opening of the transmission link comprises: performing a successive approximation register (SAR) search algorithm on the samples.

5. The method of claim 1, wherein comparing the samples of the data signal to determine the eye opening of the transmission link comprises: performing a binary search algorithm on the samples.

6. The method of claim 1, further comprising: assessing the link quality of the transmission link based upon a detected boost value of the transmission link.

7. The method of claim 1, further comprising: assessing the link quality of the transmission link based upon a detected chip temperature of the transmission link.

8. A communication system, comprising:
   a transmitter;
   a receiver;
   a transmission link communicatively coupling the transmitter to the receiver; and
   a controller in communication with the receiver, the controller configured to:
      detect an eye opening of the transmission link by:
         providing a first clock signal, providing a second clock signal that has a predetermined phase offset from the first clock signal, generating a third signal based upon the first clock signal and the second clock signal, phase shifting the third signal incrementally, sampling a data signal transmitted by the transmission link based upon the first clock signal and one or more instances of the third signal, and comparing samples of the data signal to determine the eye opening of the transmission link;

compare the eye opening with at least one of a threshold eye opening or at least one previously detected eye opening; and assess a link quality of the transmission link based upon a comparison of the eye opening with the at least one of the threshold eye opening or the at least one previously detected eye opening.

9. The communication system of claim 8, wherein the controller is further configured to provide an indication signal when the eye opening is below the threshold eye opening.

10. The communication system of claim 8, wherein the controller is further configured to provide an indication signal when a rate of reduction of the eye opening exceeds a threshold rate of reduction, wherein the rate of reduction of the eye opening is based upon a comparison of the eye opening with the at least one previously recorded eye opening.

11. The communication system of claim 8, wherein the controller is configured to perform at least one of a successive approximation register (SAR) search or a binary search algorithm on the samples to determine the eye opening of the transmission link.

12. The communication system of claim 8, wherein the controller is further configured to assess the link quality of the transmission link based upon at least one of a detected boost value or a detected chip temperature of the transmission link.

13. A non-transitory signal-bearing medium comprising one or more modules executable by a controller to cause the controller to:

detect an eye opening of a transmission link by:
providing a first clock signal, providing a second clock signal that has a predetermined phase offset from the first clock signal, generating a third signal based upon the first clock signal and the second clock signal, phase shifting the third signal incrementally, sampling a data signal transmitted by the transmission link based upon the first clock signal and one or more instances of the third signal, and comparing samples of the data signal to determine the eye opening of the transmission link;

compare the eye opening with at least one of a threshold eye opening or at least one previously detected eye opening; and assess a link quality of the transmission link based upon a comparison of the eye opening with the at least one of the threshold eye opening or the at least one previously detected eye opening.

14. The non-transitory signal-bearing medium of claim 13, wherein the one or more modules are executable by the controller to cause the controller to provide an indication signal when the eye opening is below the threshold eye opening.

15. The non-transitory signal-bearing medium of claim 13, wherein the one or more modules are executable by the controller to cause the controller to provide an indication signal when a rate of reduction of the eye opening exceeds a threshold rate of reduction, wherein the rate of reduction of the eye opening is based upon a comparison of the eye opening with the at least one previously recorded eye opening.

16. The non-transitory signal-bearing medium of claim 13, wherein the one or more modules are executable by the controller to cause the controller to perform at least one of a successive approximation register (SAR) search or a binary search algorithm on the samples to determine the eye opening of the transmission link.

17. The non-transitory signal-bearing medium of claim 13, wherein the one or more modules are executable by the controller to cause the controller to assess the link quality of the transmission link based upon at least one of a detected boost value or a detected chip temperature of the transmission link.

* * * * *